United States Patent
Rheinhardt

(10) Patent No.: US 6,601,625 B2
(45) Date of Patent: Aug. 5, 2003

(54) WHEEL WITH INTEGRAL COMPRESSED AIR TANK APPARATUS

(76) Inventor: Richard M. Rheinhardt, 1001 Sierra Blanca Ct., City of Lady Lake, Lake County, FL (US) 32158

( * ) Notice: Subject to any disclaimer, the term of this patent is extended or adjusted under 35 U.S.C. 154(b) by 0 days.

(21) Appl. No.: 09/990,457

(22) Filed: Nov. 20, 2001

(65) Prior Publication Data

US 2002/0059972 A1 May 23, 2002

Related U.S. Application Data

(60) Provisional application No. 60/252,789, filed on Nov. 22, 2000.

(51) Int. Cl.$^7$ .............................................. B60C 23/10
(52) U.S. Cl. ...................................... 152/418; 152/415
(58) Field of Search .................................. 152/415, 418, 152/427, 429, 431, 419, 420, 421, 423, 424, 425, 426

(56) References Cited

U.S. PATENT DOCUMENTS

| | | | | |
|---|---|---|---|---|
| 2,167,398 A | * | 7/1939 | Tubbs | 152/418 |
| 3,496,986 A | * | 2/1970 | Nyc | 152/418 |
| 4,169,497 A | * | 10/1979 | Tsuruta | 152/418 |
| 4,289,187 A | * | 9/1981 | Rivin | 152/418 |
| 4,896,921 A | * | 1/1990 | Sato et al. | 152/418 |
| 5,293,919 A | * | 3/1994 | Olney et al. | 152/418 |
| 5,301,729 A | * | 4/1994 | Blair | 152/429 |
| 5,355,924 A | * | 10/1994 | Olney | 152/418 |
| 5,591,281 A | * | 1/1997 | Loewe | 152/418 |
| 5,679,187 A | * | 10/1997 | Price | 152/415 |
| 5,891,278 A | * | 4/1999 | Rivin | 152/418 |

* cited by examiner

Primary Examiner—S. Joseph Morano
Assistant Examiner—Long Bao Nguyen
(74) Attorney, Agent, or Firm—Gary K. Price, Esq.

(57) ABSTRACT

An apparatus that mounts on a rim of a vehicle wheel on which a tire may be mounted. The apparatus includes a high pressure reservoir for receiving and storing compressed air from an outside source, a first mechanical valve that permits compressed air from an outside source to be directed into and stored in the high pressure reservoir, a second mechanical valve that directs air from the high pressure reservoir into the air chamber of a tire, a third mechanical valve that releases air from the air chamber of the tire, and a fourth mechanical valve that releases air from the high pressure reservoir.

4 Claims, 2 Drawing Sheets

WHEEL WITH INTEGRAL COMPRESSED AIR TANK APPARATUS

CROSS REFERENCES TO RELATED APPLICATIONS

U.S. Provisional Application for Patent No. 60/252,789, filed Nov. 22, 2000, with Title "Wheel with Integral Compressed Air Tank Apparatus" which is hereby incorporated by reference. Applicant claims priority pursuant to 35 U.S.C. ¶119(e)(i).

Statement as to rights to inventions made under Federally sponsored research and development: Not Applicable

BACKGROUND OF THE INVENTION

1. Field of the Invention.

This invention relates to an apparatus for regulating the amount of air pressure in a tire, and particularly to the inclusion of a high pressure reservoir attached to a rim of a vehicle wheel. The apparatus automatically maintains air pressure within a pre-selected range. When pressure within the tire drops below the selected threshold, air is directed from the high pressure reservoir into the tire keeping it inflated to the desired minimum pressure; and, when pressure rises above the selected threshold in the tire, air is released from the tire into the atmosphere.

2. Background Information

An improperly inflated automobile tire is a safety hazard. Maintaining proper air pressure in an automobile tire (and other type vehicles) also increases fuel efficiency and maximizes tire life.

It is well known to attach an electronic tire pressure sensor to a rim of a vehicle wheel to sense pressure within a tire chamber. Such a tire pressure sensor contains a power source, such as a battery, and provides an alarm to a vehicle driver if pressure in the tire becomes too low. When the tire pressure become too low, it is known to transfer air from some mechanical air supply that is external to the vehicle's tire, in order to obtain the proper pressure within the tire. The problem with an external air supply is that it may not be available to the user when needed, or it may require a power source that is susceptible to damage or not available when the air pressure in the tire is low.

Although an apparatus for mounting a pressure sensor on a rim of the vehicle is known, such prior art does not include a high pressure reservoir mounted to the rim and within the tire air chamber for supplying air to the tire when the tire pressure becomes too low. As such, prior art sensors may alarm the vehicle driver when the pressure is too low, but such apparatus is unable to supply air to the tire to prevent the pressure from becoming too low in the first place.

As will be seen from the subsequent description, the preferred embodiment of the present invention overcomes these and other shortcomings of prior art.

SUMMARY OF THE INVENTION

The present invention is designed to mount on a rim of a vehicle wheel over which a tubeless tire may then be mounted. The apparatus of the present invention mechanically maintains tire pressure within a pre-selected range, alleviating the need for the vehicle operator to manually inflate a tire to achieve the desired pressure. When pressure within the tire drops below a selected threshold, air stored in the apparatus' high pressure reservoir is released into the tire keeping it inflated to the desired minimum pressure; and, when pressure in the tire rises above the selected threshold, air is released from the tire into the atmosphere. The preferred embodiment includes an air inlet valve for receiving compressed air from an outside source into a high pressure reservoir mounted on the rim of the vehicle wheel, an air regulator valve to transfer said air from said high pressure reservoir into a vehicle's tire chamber, a release valve to let air out of the high pressure reservoir, if necessary, and a pressure activated air release valve to let air out of the vehicle's tire when necessary.

DESCRIPTION OF THE PREFERRED EMBODIMENTS

Figure 1:
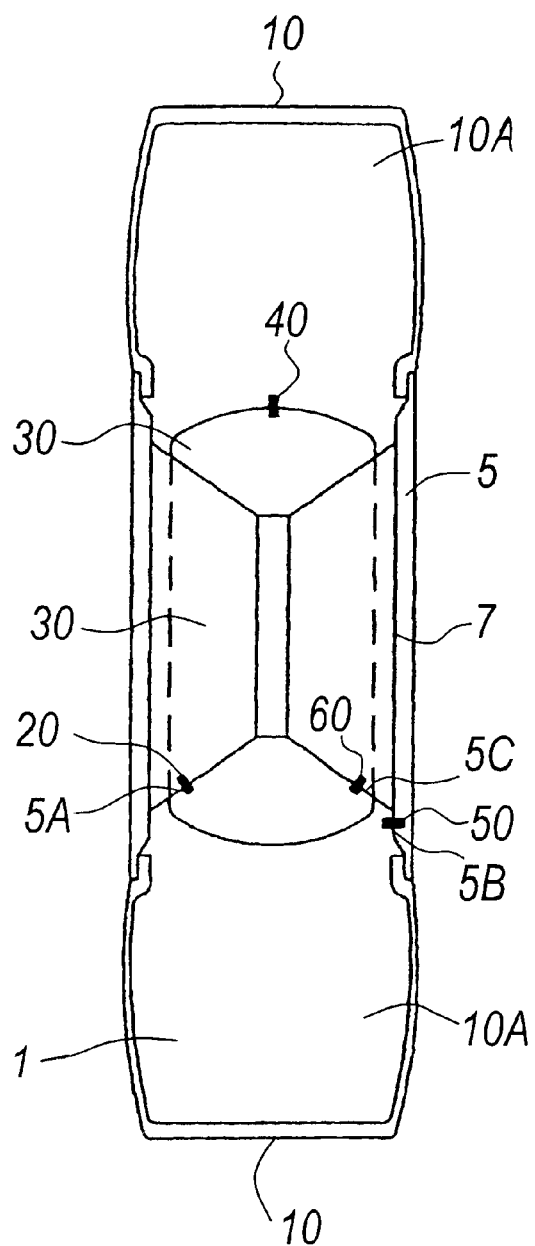
FIG. 1 is a cross-sectional view of the components of a preferred embodiment of the present invention.
Figure 2:
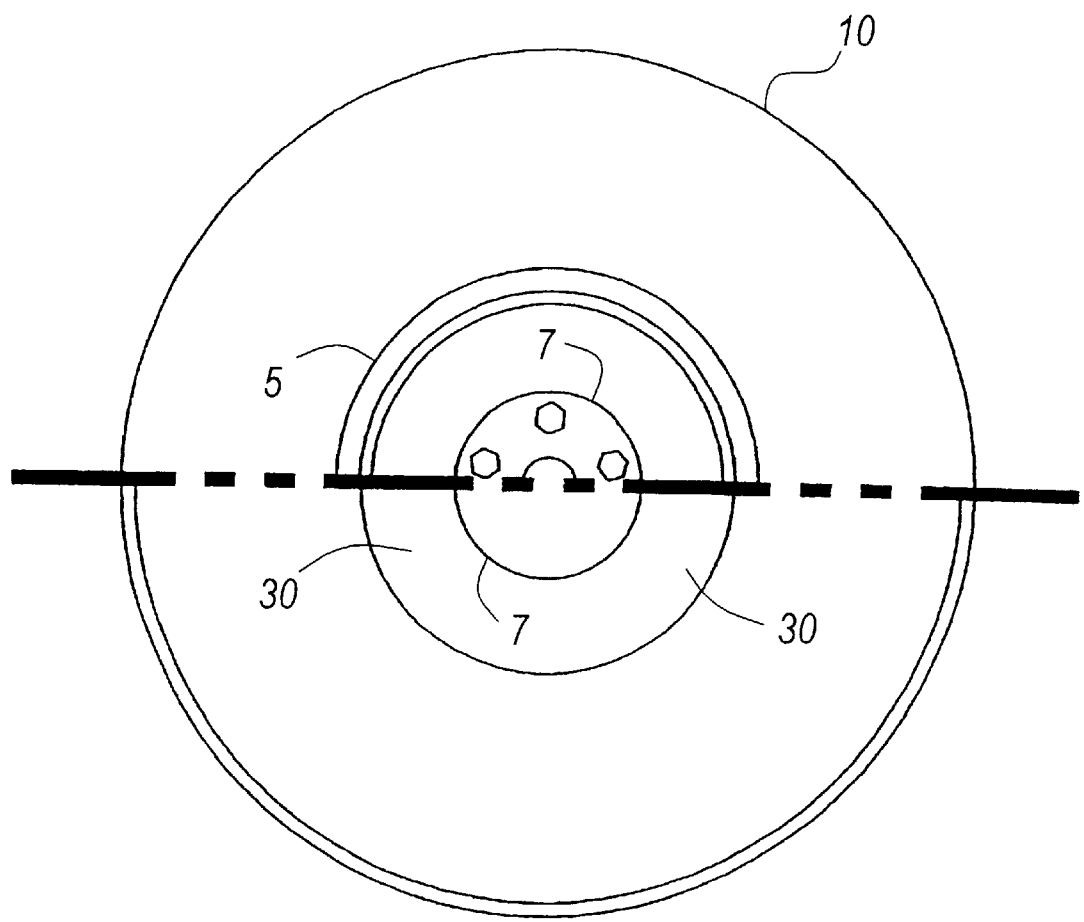
FIG. 2 illustrates a side sectional view of the apparatus of FIG. 1.

FIGS. 1–2 illustrate a preferred embodiment of a wheel with integral compressed air tank apparatus 1 made in accordance with the present invention. The apparatus 1 includes a high pressure reservoir 30 that is mounted on a rim 5 of a vehicle wheel (not shown) over which a tire 10 having an air chamber 10A may then be mounted. As best shown in FIG. 2, the rim 5 includes an interior surface 7, and openings 5A, 5B, and 5C.

The high pressure reservoir 30 is disposed around the periphery of the interior surface 7 of the rim 5. The high pressure reservoir 30 is further contained within the air chamber 10A of the tire 10, once the tire 10 is mounted on the rim 5. As shown in FIG. 1, the apparatus 1 further includes an air inlet valve 20, an air regulator valve 40, a pressure activated air release valve 50, and a pressure activated air release valve 60.

The air inlet valve 20 outwardly projects from the high pressure reservoir 30 out through the first opening 5A of the rim 5 and permits compressed air (not shown) from an outside source to be directed into and stored in the high pressure reservoir 30. The air inlet valve 20 is accessible from outside the apparatus 1 and the rim 5 for receiving the air from said outside source. As best shown in FIG. 2, the high pressure reservoir 30 is disposed around the periphery of the interior surface 7 of the rim 5 and stores compressed air received from the outside source in communication with the air inlet valve 20.

The high pressure reservoir 30 may be constructed of any number of lightweight materials, such as, but not limited to, aluminum, titanium, or steel-belted tire-like materials.

The air regulator valve 40 outwardly projects from the reservoir 30 and into the chamber 10A of the tire 10. The air regulator valve 40 permits air to be directed from the high pressure reservoir 30 into the chamber 10A of the tire 10. The air regulator valve 40 includes mechanical activation means that when activated, transfers the air stored in the reservoir 30 into the chamber 10A of the tire 10. Air flows from the high pressure reservoir 30 into the air chamber 10A of the tire 10 when the pressure in the air chamber 10A drops below a pre-selected pressure activation threshold. The said mechanical means to activate the air regular valve 40 at the pre-selected pressure is known.

The pressure activated air release valve 50 outwardly projects from the air chamber 10A of the tire 10 through the second opening 5B of the rim 5. The pressure activated air valve 50 when activated releases air from the air chamber 10A of the tire 10 into the atmosphere. The pressure activated air release valve 50 includes mechanical activation means that when activated, releases the air pressure from the air chamber 10A of the tire 10 into the atmosphere. The pressure activated air release valve 50 is activated when the air pressure in the chamber 10A of the tire 10 exceeds a pre-selected pressure threshold. The said mechanical activation means to activate the pressure activated air release valve 50 at the pre-selected pressure threshold is known.

The pressure activated air release valve 60 outwardly projects from the high pressure reservoir 30 through the third opening 5C of the rim 5. The pressure activated air release valve 60 includes mechanical activation means that when activated, releases the air stored in the high pressure reservoir 30 into the atmosphere. The pressure activated air release valve 60 is activated when air pressure in the reservoir 30 exceeds a pre-selected pressure threshold. The said mechanical activation means to activate the pressure activated air release valve 60 at the pre-selected pressure threshold is known.

Although the description herein refers primarily to said mechanical activation means that activates the valves 20, 40, 50 and 60, it is understood by one skilled in the art that such mechanical means may be replaced with electronic pressure sensors for each of the valves that provide signals for the opening and closing of the valves. However, because electronic valves would be under forces typically associated with a spinning tire, they would be more susceptible to malfunctioning than the mechanical valves described in the preferred embodiment, and would further require a power source, such as batteries, that would have to be maintained.

The air inlet valve 20, the air regulator valve 40, the pressure activated air release valve 50, and the pressure activated air release valve 60, having the above-described mechanical activation means, may be obtained from a variety of vendors or can be assembled with modified valve parts already available in the art. A set of air valves with the desired pre-selected opening and closing specifications can be chosen to match the pressure range requirements of any tire to be mounted on the wheel rim. The specific valves or valve parts can also be chosen to withstand conditions normally associated with a rapidly spinning wheel, including, but not limited to, centripetal forces, road shock, dirt, water, and changes in temperatures resulting from weather and/or frictional heat.

It should be understood by one skilled in the art that the functions of the air inlet valve 20 and the pressure activated air release valve 60 may be combined into a single valve. It should be further understood that although the description herein describes the valve 20, 50 and 60 as being pressure activated, it is obvious that such valves may be manually activated to release air as well. Further, while in the preferred embodiment, the high pressure reservoir 30 is disposed around the interior surface 7 of the rim 5 of the wheel vehicle, it is understood that the high pressure reservoir 30 may be constructed as an integral part of the rim 5 over which the tire 10 is then mounted.

Although the description above contains many specificities, these should not be construed as limiting the scope of the invention but as merely providing illustrations of some of the presently preferred embodiments of this invention. For example, while the preferred embodiment describes, the high pressure reservoir 30 positioned around the interior surface 7 of the rim 5, the reservoir 30 may extend partially around the rim 5. In such case, weights (not shown) would be mounted to the rim 5 in order to maintain balance in the wheel. Another example would be to mount two separate high pressure reservoirs, each mounted halfway around the interior surface 7 of the rim 5, wherein one of the two reservoirs and its associated valves counterbalances the weight of the second reservoir and its associated valves. Thus the scope of the invention should be determined by the appended claims in the formal application and their legal equivalents, rather than by the examples given.

I claim:

1. An apparatus for mounting on a rim of a vehicle wheel on which a tire may be mounted, said apparatus comprising:
    a high pressure reservoir for receiving and storing compressed air from an outside source;
    a first valve projecting from the high pressure reservoir through a first opening in the rim, said first valve for receiving the compressed air in the reservoir from the outside source;
    a second valve projecting from the high pressure reservoir into the tire, said second valve for sensing the pressure in the tire and directing air from the reservoir into the tire;
    a third valve projecting from the tire through a second opening in the rim, said third valve for sensing the pressure in the tire and releasing the air from the tire;
    a fourth valve projecting from the high pressure reservoir through a third opening in the rim, said fourth valve for sensing the air pressure in the reservoir and releasing the air from the reservoir.

2. An apparatus as recited in claim 1, wherein, the first, second, third and fourth valves include mechanical activating pressure sensors.

3. An apparatus as recited in claim 1, wherein, the first, second, third and fourth valves include electronic activated pressure sensors.

4. An apparatus as recited in claim 1, wherein, the high pressure reservoir and the rim having abutting surfaces.

* * * * *